Nov. 28, 1961 P. C. TRAUTMANN 3,010,760
RETRACTABLE TAIL GATE FOR STATION WAGONS
Filed May 4, 1960 2 Sheets-Sheet 1

INVENTOR.
PETER C. TRAUTMANN
BY J. Ledermann
ATTORNEY

Nov. 28, 1961   P. C. TRAUTMANN   3,010,760
RETRACTABLE TAIL GATE FOR STATION WAGONS

Filed May 4, 1960   2 Sheets-Sheet 2

INVENTOR.
PETER C. TRAUTMANN
BY J. Ledermann
ATTORNEY

United States Patent Office 3,010,760
Patented Nov. 28, 1961

3,010,760
RETRACTABLE TAIL GATE FOR STATION WAGONS
Peter C. Trautmann, 3929 58th St., Woodside, N.Y.
Filed May 4, 1960, Ser. No. 26,781
4 Claims. (Cl. 296—57)

This invention relates to automotive vehicles and, more particularly, to automotive station wagons.

Ordinarily, it is necessary to lift an object over the rearwardly extending tailgate of a station wagon in order to place it upon the floor of the vehicle. This is not only an inconvenience, but also hazardous in many instances. It is therefore an object of the present invention to provide an automotive station wagon having a tailgate which can be selectively moved between a rearwardly extending position and a forwardly retracted position in order to facilitate access to the floor of the vehicle, so as to overcome the aforementioned difficulties.

Another object of the present invention is to provide a station wagon having a tailgate which is hingedly mounted upon the vehicle body for slidable movement between a normally rearwardly extending horizontal position and a forwardly retracted position, and also pivotal movement between a normally closed position and an open position relative to the vehicle body. The term horizontal as used herein in reference to the tailgate implies that the vehicle is positioned on a truly horizontal surface so that the floor of the vehicle is horizontally positioned.

Still an additional object of the present invention is to provide a station wagon having a tailgate of the type described which is extremely simple in construction, efficient in operation, and which can be readily adapted for use with all types and models of station wagons.

All of the foregoing and still further objects and advantages of this invention will become apparent from a study of the following specification, taken in connection with the accompanying drawing, wherein.

Figure 1:
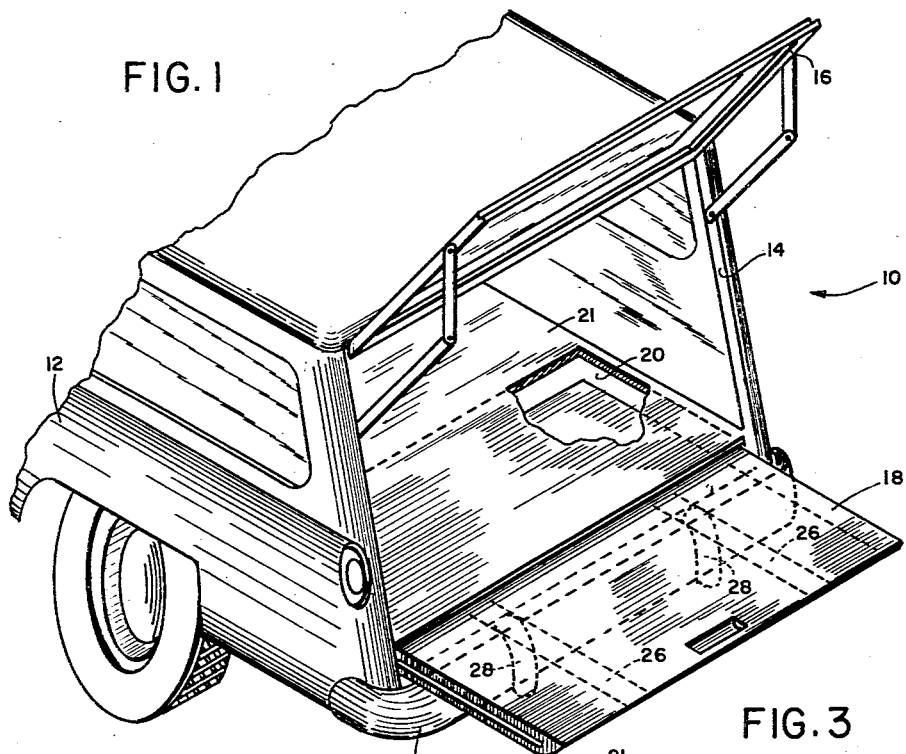
FIGURE 1 is a fragmentary rear perspective view, with parts broken away, of a station wagon having a tailgate assembly made in accordance with one form of the present invention.
Figure 3:
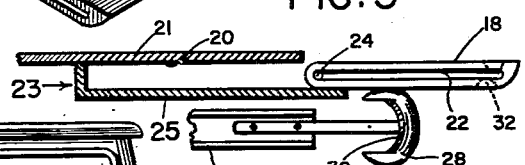
FIGURE 3 is a fragmentary cross sectional view showing manner in which the tailgate is mounted upon the vehicle body.
Figure 2:
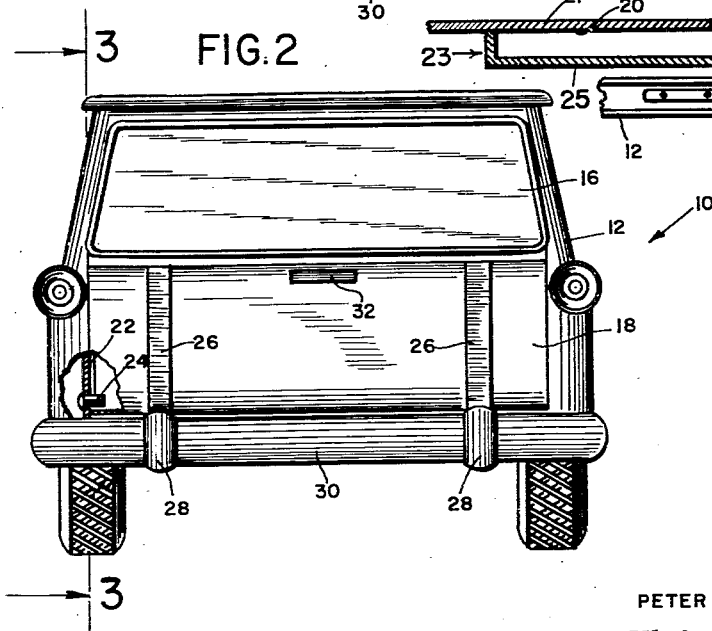
FIGURE 2 is a rear view of the assembly shown in FIGURE 1 with the parts in a closed position.

Referring now to the drawing, and more particularly to FIGURES 1 to 3, a station wagon 10 having a tailgate made in accordance with the present invention, is shown to include a body 12 having an opening 14 in the rear end thereof which is partly closed by a rear window 16 and a tailgate 18.

As is clearly shown in FIGURES 1 and 3 of the drawing, the floor 21 of the vehicle is provided with a depending structure 23 provided with a bottom wall 25 parallel with the floor 21 forming or enclosing a well or compartment 20 under the rear end of the floor, that is substantially parallel to the floor 21 and is open at its rear end, and which slidably receives the tailgate 18 for movement longitudinally between a normally extended and retracted position. The lateral edges of the tailgate 18 are provided with longitudinal slots 22 that slidably receive inwardly extending hinge pins 24 mounted upon the opposite side members 14 of the rear opening into the vehicle body 12, which pins 24 accommodate both the reciprocating sliding movement of the tailgate 18 and the pivotal movement of the tailgate in the rearwardly extended position between a closed position with the window 16 and a rearwardly extending open position.

Parallel longitudinal wear plates or strips 26 mounted upon the outer surface of the tailgate 18 are slidably engageable with upwardly extending bearing portions 28 mounted upon the rear bumper 30 of the vehicle in order to accommodate such reciprocating longitudinal sliding movement of the tailgate 18 with respect to the well 20 and to provide outer supports for the extended tailgate. An inwardly recessed handle 32 in the tailgate 18 facilitates the movement thereof between the opposite sliding and pivoted positions.

It will now be recognized that in actual use, the tailgate 18 cooperates with the rear window 16 in order to close the rear opening 14 of the vehicle body 12. However, the tailgate 18 is readily movable pivotally about the pins 24 to the rerawardly extending open position shown in FIGURE 1, in a conventional manner. The tailgate 18 is then further movable longitudinally inwardly into the interior of the well 20 in order to provide more convenient access to the floor 21 of the vehicle for loading and unloading the interior of the vehicle. Such reciprocating sliding movement of the tailgate 18 is facilitated by the wear plates 26 and support or bearing members 28, thus making it possible to deposit material directly upon the floor 21 without having to lift it over the rearwardly extending tailgate 18 as is usually required.

Figure 4:
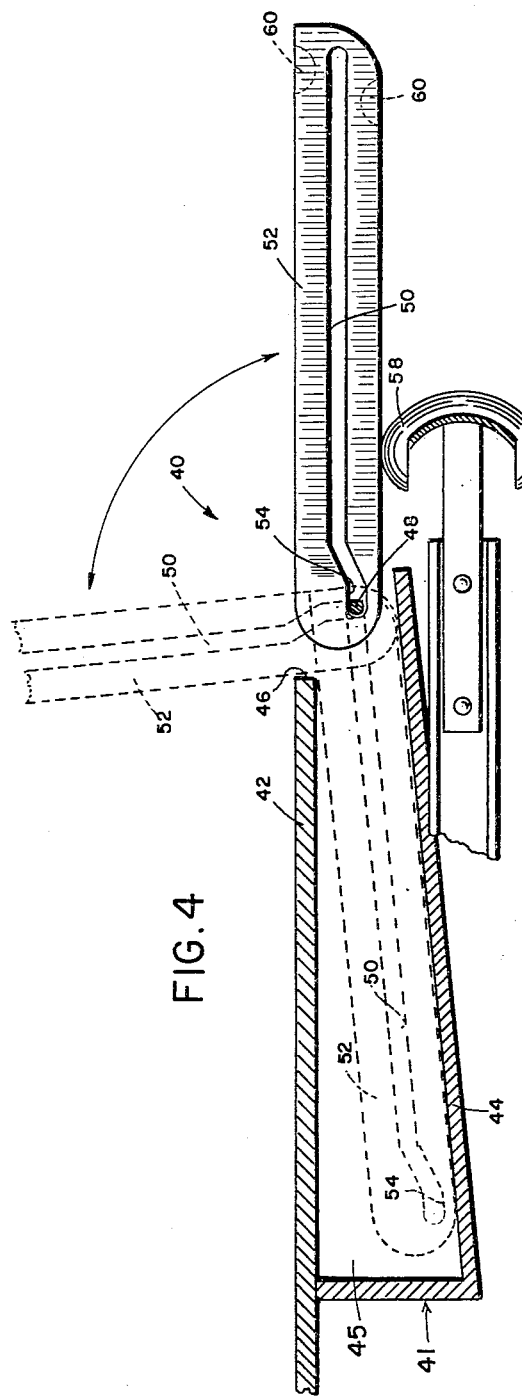
FIGURE 4 is a view similar to FIGURE 3, illustrating a slightly modified form of construction.
Figure 5:
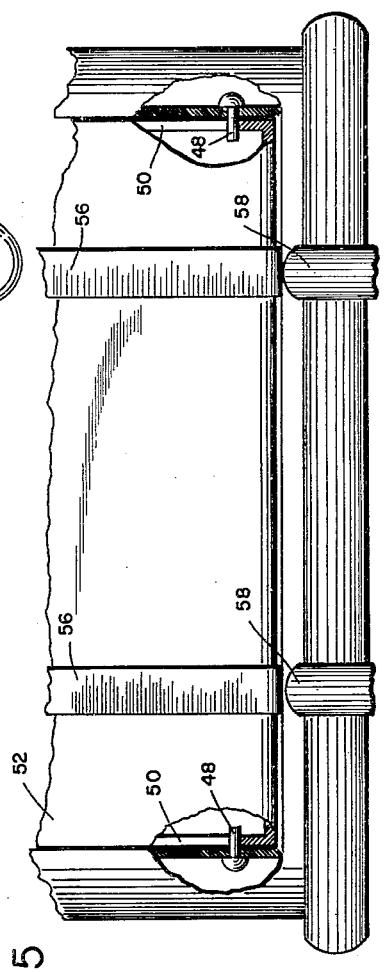
FIGURE 5 is an enlarged fragmentary rear elevational view, with parts broken away, of the assembly shown in FIGURE 4.

Reference is now made to FIGURES 4 and 5 of the drawing, which illustrate a slightly modified form of construction which will enable the upper surface of the tailgate to be elevated to the same level as the upper surface of the floor when the tailgate is in extended position. In this assembly 40, the floor 42 is similarly provided with a depending structure 41 forming under the rear end of the floor a compartment or well 45 whose bottom wall 44 slopes forwardly and downwardly from the rear end of the station wagon so as to slidably support the tailgate 52 for reciprocating longitudinal movement along a line that is inclined with respect to a horizontal plane. The bottom 44 furthermore extends rearwardly beyond the rear edge of the floor 42 a distance corresponding substantially to the thickness of the tailgate 52, which arrangement allows the tailgate 52 to abut against the end 46 of the floor 42 when in the closed position shown in broken lines. A pair of hinge pins 48 carried by the sides of the vehicle body are slidably received within longitudinal slots 50 on the lateral edges of the tailgate 52 in a manner similar to that hereinbefore described. However, a terminal portion 54 of each slot 50 adjacent to the bottom edge of the tailgate, is offset from the main slot 50 a sufficient distance to cause the tailgate 52 to be elevated slightly during the terminal portion of its extended longitudinal movement. This slight lifting action upon the tailgate 52 brings the upper surface thereof into the same plane as the upper surface of the floor 42 of the station wagon, thus providing a smooth and continuous surface over which articles may be loaded into the station wagon, thereby avoiding the different levels between the upper surface of the tailgate and the floor which would otherwise result.

This tailgate 52 is further provided with wear plates or straps 56 which slide upon bearing projections or elements 58 of or on the bumper, in the manner hereinbefore described, as well as recessed hand holds 60 for opening and closing the tailgate.

Except for the inclination of the bottom of the well structure and the terminal offset portion 54 of the slot 50, the general operation and arrangement of parts is similar to that hereinbefore described.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. An automotive station wagon including a vehicle body provided with a floor and a rear opening into the body, opposed side members on the body defining the width of said opening, a tailgate adapted when in closed position to close at least the lower portion of said opening, a rear bumper having horizontally spaced upward projections, said floor having a structure mounted thereunder including a bottom wall enclosing a compartment open at the rear end, said bottom wall extending rearward beyond the rear edge of said floor, inwardly extending aligned pivot pins mounted on said side members and positioned below the level of said floor, said pins being further positioned vertically above that portion of said bottom wall which extends beyond said rear edge of the floor, the lateral edges of the tailgate having aligned longitudinal slots, said pins registering slidably in said slots, said pins being positioned in the lower ends of said slots when the tailgate is in closed position for pivotal movement of the tailgate to an open position about the pins, the tailgate when in open position with said pins registering in said lower ends of said slots being positioned horizontally and being adapted to be slid forward into said compartment, said pins being positioned in the upper ends of said slots when the tailgate has been slid home into the compartment, portions of the tailgate remote from the lower edge thereof resting on said projections when the tailgate is in said open position, said projections having their upper extremities positioned at a level to support the open tailgate in said horizontal position.

2. An automotive station wagon according to claim 1, the outer surface of the tailgate having elongated longitudinal wear plates thereon transversely spaced and positioned to engage said projections when the tailgate is in said open horizontal position and during sliding of the tailgate into said compartment.

3. An automotive station wagon according to claim 1, said bottom wall being inclined downwardly in a forward direction, each of said slots having an offset lower end portion deformed in a direction toward the outer surface of the tailgate whereby the lower end portions of the slots elevate the lower edge of the tailgate in said open horizontal position thereof to position the inner surface of the tailgate in the plane of said floor.

4. An automotive station wagon according to claim 3, the outer surface of the tailgate having elongated longitudinal wear plates thereon transversely spaced and positioned to engage said projections when the tailgate is in said open horizontal position and during sliding of the tailgate into said compartment.

References Cited in the file of this patent

UNITED STATES PATENTS

| | | |
|---|---|---|
| 2,370,427 | Sherry | Feb. 27, 1945 |
| 2,538,930 | Zummach | Jan. 23, 1951 |
| 2,800,358 | Sherrick | July 23, 1957 |

FOREIGN PATENTS

| | | |
|---|---|---|
| 402,518 | Great Britain | Dec. 7, 1933 |